[15] 3,652,939

Levasseur

[45] Mar. 28, 1972

[54] APPARATUS FOR IMPROVING THE SIGNAL TO NOISE RATIO OF SIGNALS RECEIVED AT TWO ANTENNAS

[72] Inventor: Georges Levasseur, La Talmouse Par Goussainville, France

[73] Assignee: C.I.T.-Compagnie Industrielle Des Telicommunications, Paris, France

[22] Filed: Nov. 7, 1969

[21] Appl. No.: 874,943

[30] Foreign Application Priority Data

Nov. 7, 1968 France..................................172984

[52] U.S. Cl...................................325/367, 325/42, 325/65, 325/305, 325/369, 325/371, 325/473, 325/476
[51] Int. Cl......................................H04b 1/18, H04b 15/00
[58] Field of Search..................325/367, 369, 371, 473, 474, 325/475, 476, 305, 42, 65; 328/162, 165, 166

[56] References Cited

UNITED STATES PATENTS

| | | | |
|---|---|---|---|
| 2,650,297 | 8/1953 | Damron | 325/371 X |
| 3,235,807 | 2/1966 | Appel | 325/371 X |

*Primary Examiner*—Robert L. Griffin
*Assistant Examiner*—Kenneth W. Weinstein
*Attorney*—Craig, Antonelli and Hill

[57] ABSTRACT

Device for improving the signal/noise ratio $S + B_1$ and $S + B_2$ coming from two aerials, comprising two correlators with polarity coincidence, whose first inputs receive chopped tensions $x + y$ and $x - y$, $x$ and $y$ being sinusoidal voltages depending respectively on the correlation coefficients of noise $B_1$, $B_2$ and of the said noise put in phase coincidence, and whose second inputs receive chopped tensions $S + B_1$ and $S + B_2$, the required signal being collected at the output of an adder whose inputs are connected to the outputs of the said correlators.

11 Claims, 1 Drawing Figure

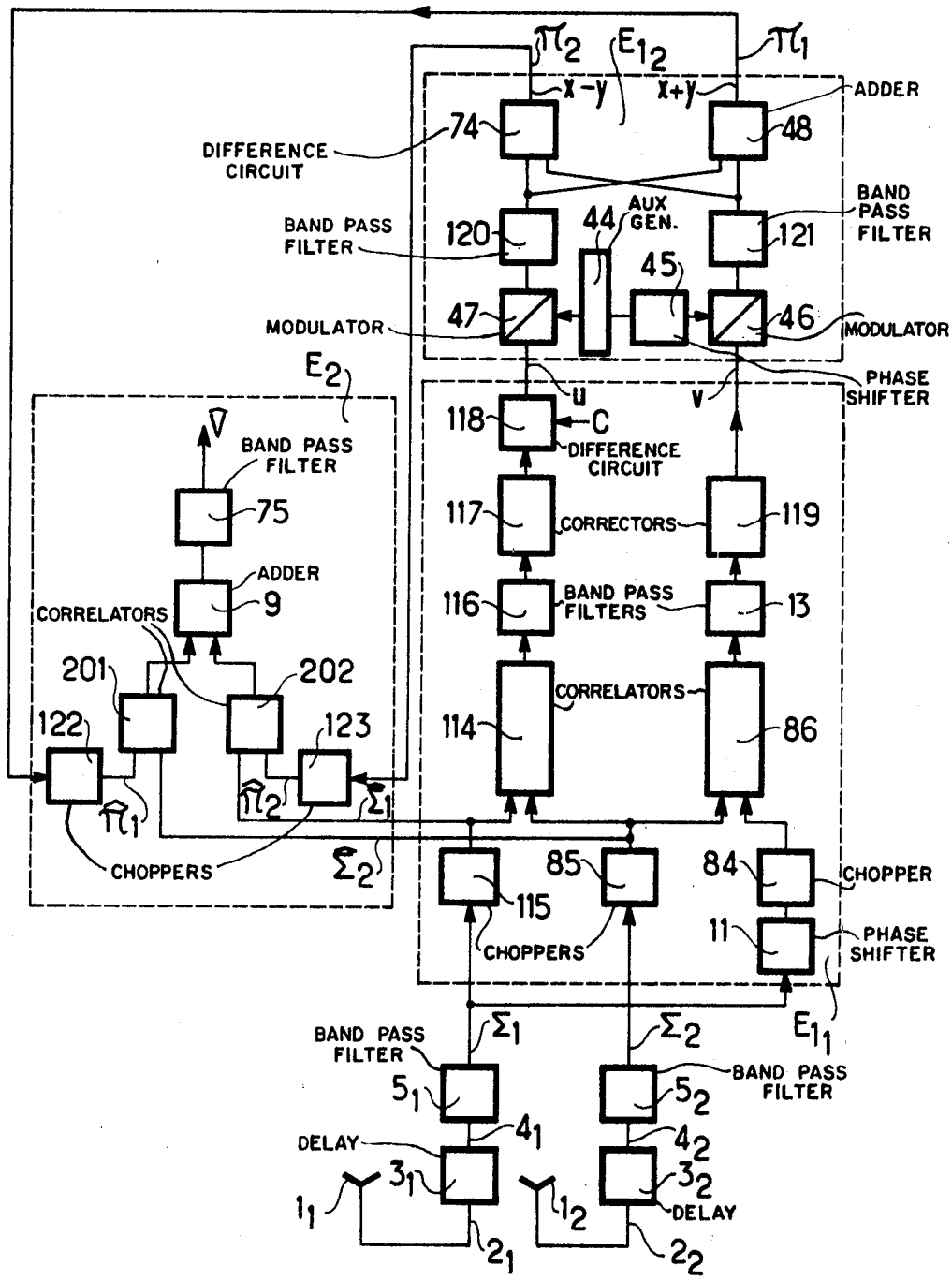

APPARATUS FOR IMPROVING THE SIGNAL TO NOISE RATIO OF SIGNALS RECEIVED AT TWO ANTENNAS

In French Pat. No. 1,347,229 of Nov. 16, 1962, and in additions thereto, there is described a device for improving the signal-to-noise ratio of narrow-band signals obtained from electromagnetic, ultrasonic or other signals, and picked up by aerials comprising several distinct pick-up elements.

In the case of two aerials, $S$ indicates useful signals picked up by the latter, centered on a frequency $f_o$, and made coincident by delay elements, and $B_1$ and $B_2$ indicate interrelated noise signals associated with each of the said useful signals, such that there are applied to the input of the device proper two signals $\Sigma_1 = S + B_1$ and $\Sigma_2 = S + B_2$.

These signals are applied to a first determination sub-assembly designated $E_1$, at whose output are received two slowly variable voltages $u$ and $v$ which respectively represent the difference between the two noise levels $B_1$ and $B_2$ and the mean of the product of the two noise levels when arranged in phase-quadrature.

These voltages $u$ and $v$ are applied to a second determination sub-assembly, indicated $E_1$, comprising means for forming two voltages $x$ and $y$, having amplitudes respectively proportional to $u$ and $v$ and having a given frequency $F \neq f_o$. At outputs of the sub-assembly $E_1$ are received voltages $\pi_1 = x + y$ and $\pi_2 = x - y$.

Also, the voltages $\Sigma_1$ and $\Sigma_2$ on the one hand, $\pi_1$ and $\pi_2$ on the other hand, are completely chopped; the four voltages obtained are designated respectively $\bar{\Sigma}_1, \bar{\Sigma}_2, \bar{\pi}_1,$ and $\bar{\pi}_2$.

The invention has for an object a simplified device, applicable only to reception of narrow-band signals, essentially distinguished by the fact that the said voltages $\pi_1$ and $\pi_2$ are respectively applied to first input of two polarity-coincidence correlators, whose second inputs receive respectively the voltages $\bar{\Sigma}_1$ and $\bar{\Sigma}_2$ resulting from the chipping of the voltages $\Sigma_1$ and $\Sigma_2$, the outputs of the two correlators being respectively connected to inputs of a summation element followed by a band-pass filter at whose output is obtained a signal V including a useful signal S whose phase is the same as that of the signal S, but which is accompanied by a noise signal of reduced amplitude.

The single accompanying drawing shows schematically, by way of example, a device according to the invention.

Two aerial elements $1_1$ and $1_2$ are respectively associated with two electrical paths $2_1$ and $2_2$ in which are inserted respective delay elements $3_1$ and $3_2$ serving to compensate the difference between the useful signals received on the two paths in such manner as to provide at their respectively outputs $4_1$ and $4_2$ two entirely identical useful signals $S(t)$.

It is admitted that the spectrum of the signal $S(t)$ is completely included in a narrow band of frequencies $f_o \pm \Delta f$.

At the outputs $4_1$ and $4_2$ are respectively connected two identical band-pass filters $5_1$ and $5_2$, whose narrow band $2\Delta f$ is centered on the frequency $f_o$ and entirely includes the useful signals $S(t)$ to be detected. On each path, the gains of these filters are identical, constant and advantageously equal to unity in the band under consideration and zero outside the said band.

At the outputs of the two filters $5_1$ and $5_2$ the useful signal is still $S(t)$ and the two interference noise signals are respectively $B_1(t)$ and $B_2(t)$ and in each path at the input of an assembly $E_1$, for determination of the correction to be made, arrives an aggregate signal $\Sigma_i$ composed of a useful signal $S$ and a noise signal $B_i$, the index $i$ indicating the number of the path.

At the input of the assembly $E_1$ there are thus two signals $\Sigma_1 = S + B_1$ and $\Sigma_2 = S + B_2$.

In the sub-assembly $E_1$ are evaluated, from characteristics of the interrelationship of the noise signals $B_1$ and $B_2$, two voltages $\pi_1$ and $\pi_2$ subsequently directed towards the assembly $E_2$ to participate in modification of the signal-to-noise ratio.

The assembly $E_1$ includes two sub-assemblies, one $E_{1_1}$ in which are carried out operations relating to the interrelationship of the noise signals $B_1$ and $B_2$, the other $E_1$ for forming the said voltages $\pi_1$ and $\pi_2$ from the voltages $u$ and $v$ leaving the preceding sub-assembly.

In the sub-assembly $E_1$, the product of the two voltages from the filter $5_1$ and $5_2$ is obtained with the aid of a polarity-coincidence correlator 114, preceded by two respective chopping circuits 115 and 85, providing at their outputs positive or negative square-wave voltages following the polarity of the input voltages.

The coincidence correlator 114 provides at its output a regulated voltage equal to unity, positive when the two input units have the same sign, negative in the opposite case.

The output of the correlator 114 is connected to a band-pass filter 116 with time constant T which is large in comparison with the reciprocal of the bandwidth $\Delta f$ of the filters $5_1$ and $5_2$.

If the regulated correlation coefficient of the noise signals $B_1$ and $B_2$ is designated $R(\theta)$, the voltage at the output of the filter 116 does not have the exact value $R(\theta)$, by reason of the chopping; in fact there is obtained at the output of the filter 116 a voltage $e = 2\pi \sin^{-1}[R(\theta)]$. There is therefore connected at the output of the filter 116 a corrector element 117 providing at its output a voltage equal to $\sin[\pi/2 \, e]$ when it is supplied with an input voltage $e$; there is thus obtained at the output of the corrector element the slowly variable voltage of value $R(\theta)$, representing the regulated correlation coefficient of the noise signals $B_1$ and $B_2$, of value less than unity.

The element 118 obtains the difference between a direct voltage C equal to unity and the regulated correlation coefficient of the noise signals $B_1$ and $B_2$ represented by a voltage equal to $R(\theta)$. The voltage obtained at the output of the element 118 is:

$$u = 1 - R(\theta)$$

It is slowly variable and of constant sign.

The measurement of the regulated correlation coefficient of the two noise signals $B_1$ and $B_2$, arranged in phase quadrature, is carried out by a polarity-coincidence correlator 86 which obtains the product of the voltages appearing at the outputs of the chopper circuits 84 and 85.

The chopper circuit 84, identical to the chopper circuits 115 and 85, is preceded by an element 11 assuring dephasing by $\pi/2$ of the voltage $\Sigma_1$ with respect to the voltage $\Sigma_2$.

The correlator 86, identical to the correlator 114, is connected to a band-pass filter 13 having the same time constant T as the band-pass filter 116 of the chain for formation of the voltage $u$. The voltage obtained at the output of filter 113 must be likewise corrected in a corrector element 119, identical to the element 117, so as to provide at its output a voltage $v = J(\theta)$ representing the regulated correlation coefficient of the two noise signals $B_1$ and $B_2$ arranged in phase quadrature with one another.

The voltages $u$ and $v$ leaving sub-assembly $E_1$ are applied to the input of sub-assembly $E_1$. The latter comprises an auxiliary generator 44 supplying an auxiliary voltage at a frequency $F$ different from the mean frequency of the useful signal, and which is applied on the one hand to a modulator 47 supplied by another line with the very low frequency voltage $u$, and on the other hand, by the intermediary of a phase-shifter producing a phase shift of $-\pi/2$, to a modulator 46 supplied by another line with the equally low frequency voltage $v$.

The outputs of the two modulators 47 and 46 are respectively connected to band-pass filters 120 and 121, both being centered on the frequency $F$ and respectively supplying at their outputs the voltages $x$ and $y$, at frequency $F$ and of slowly variable amplitudes proportioned to the voltages $u$ and $v$ respectively.

The voltage $x$ is applied simultaneously to one of the inputs of a summation element 48 and to one of the inputs of an element 74 providing a difference, whereas the voltage $y$ is applied to each of the other inputs of the said elements 74 and 48; there is thus obtained at the output of the element 48 a voltage $\pi_1 = x + y$, and at that of 74 a voltage $\pi_2 = x - y$, both being alternating voltages at frequency $F$.

The final voltages $\pi_1$ and $\pi_2$ are then directed to the assembly $E_2$.

In the latter, the said voltages, after having passed through chopper circuits 122 and 123, are respectively applied to first inputs of two polarity-coincidence correlators 201 and 202 whose second inputs respectively receive the voltages $\Sigma_1$ and $\Sigma_2$ from the chopper circuits 115 and 85 of the sub-assembly $E_1$. The outputs of the correlators 201 and 202 are connected to the inputs of a summation element 9 followed by a band-pass-filter 75.

At the output of this filter there is received a signal V comprising a useful signal S whose phase is the same as that of the signal S applied to the input of the device, this signal S being accompanied by an interference noise signal of reduced amplitude. The amplitude of the signal S depends on the direction from which come the correlated noise signals $B_1, B_2$.

I claim:

1. Device for improving the signal-to-noise ratio of electrical signals received on two aerials, applicable in the case when the useful signals occupy a narrow band of frequencies around a mean value $f_o$, and when the noise signals $B_1$ and $B_2$ received on the two aerials are at least partially correlated, comprising first means responsive to the signals received at said aerials for providing a pair of useful signals from each aerial identical to a common value S, so as to obtain at the output of the said means signals $\Sigma_1 = S + B_1$ and $\Sigma_2 = S + B_2$ a first circuit connected to said first means for generating a voltage $u$ as a linear function of the correlation coefficient of the noise signals $B_1$ and $B_2$ and a voltage $v$ proportional to the correlation coefficient of the noise signals $B_1$ and $B_2$ arranged in phase quadrature with respect to one another, a second circuit connected to said first circuit comprising an auxiliary generator of a given frequency $F$, means for obtaining from this generator and said first circuit sinusoidal voltages $x$ and $y$ of frequency $F \neq f_0$ and of amplitudes respectively proportional to $u$ and $v$, and means for forming voltages $\pi_1 = x + y$ and $\pi_2 = x - y$, and means responsive to said second circuit for chopping the voltages $\pi_1$ and $\pi_2$ and for applying them to respective first inputs of two polarity-coincidence correlators whose second inputs receive respectively voltages $\Sigma_1$ and $\Sigma_2$ resulting from chopping $\Sigma_1$ and $\Sigma_2$, the outputs of these two correlators being respectively connected to two inputs of a summation element, followed by a band-pass filter at whose output is obtained the required useful signal.

2. An apparatus for improving the signal to noise ratio of an information signal which contains a useful component and a noise component, said signal being received at a plurality of pick-up elements, comprising:

first means for producing original electrical signals in response to said information signal received on said plurality of pick-up elements;

second means responsive to said electrical signals for generating therefrom a first electrical signal representative of the linear correlation coefficient of the noise components in said original electrical signals, and a second electrical signal representative of the correlation coefficient of said noise components separated in phase-quadrature;

third means responsive to said first and second electrical signals for modifying said first and second electrical signals and for generating sum and difference signals representative of the sum and difference respectively of the modified forms of said first and second electrical signals; and fourth means responsive to said first and second electrical signals and responsive to said sum and difference signals for generating an output signal representative of said information signal containing substantially the same useful component but having a noise component substantially attenuated, whereby the signal to noise ratio of said information signal is increased.

3. The apparatus according to claim 2, wherein said first means includes delay means for delaying said original electrical signals, whereby said original electrical signals have substantially the same phase.

4. The apparatus according to claim 2, wherein said second means includes a first correlation means for generating a signal representative of polarity coincidence of the noise components in said original electrical signals.

5. The apparatus according to claim 4, wherein said second means includes a second correlation means for generating a signal representative of polarity coincidence of the noise components in said original electrical signals, said noise components having been separated in phase-quadrature.

6. The apparatus according to claim 2, wherein said third means includes means for modifying said first electrical signal with a first modulation signal.

7. The apparatus according to claim 6, wherein said third means includes means for modifying said second electrical signal with a second modulation signal in phase-quadrature with said first modulation signal.

8. The apparatus according to claim 2, wherein said fourth means includes a means for generating a third electrical signal representative of polarity coincidence of said first electrical signal and said sum signal.

9. The apparatus according to claim 8, wherein said fourth means includes means for generating a fourth electrical signal representative of polarity coincidence of said second electrical signal and said difference signal.

10. The apparatus according to claim 9, further including means for summing said third and fourth electrical signals respectively.

11. The apparatus according to claim 1, wherein said second means includes means responsive to said original electrical signal for chopping each of said first and second electrical signals, and wherein said fourth means includes means responsive to said sum and difference signals for chopping said sum and difference signals.

* * * * *